United States Patent [19]
Blair

[11] Patent Number: 5,606,514
[45] Date of Patent: Feb. 25, 1997

[54] CYCLIC SIGNAL PROCESSING

[75] Inventor: William R. Blair, Erie, Pa.

[73] Assignee: American Meter Company, Horsham, Pa.

[21] Appl. No.: 517,405

[22] Filed: Aug. 21, 1995

[51] Int. Cl.[6] .................................................. G06F 17/00
[52] U.S. Cl. ............................................................ 364/569
[58] Field of Search .................................. 364/569, 517,
364/486, 487, 143; 73/262, 274, 3; 327/60,
72, 73; 324/76.55; 323/284, 285

[56] References Cited

U.S. PATENT DOCUMENTS

| | | | |
|---|---|---|---|
| 4,769,597 | 9/1988 | Sano | 327/72 |
| 4,848,148 | 7/1989 | Capriotti et al. | 73/262 |
| 5,094,333 | 3/1992 | Minura | 323/284 |
| 5,202,813 | 4/1993 | Uota et al. | 323/284 |
| 5,377,282 | 12/1994 | Fellows et al. | 327/72 |
| 5,471,130 | 11/1995 | Agiman | 323/284 |

Primary Examiner—James P. Trammell
Assistant Examiner—Bryan Bui
Attorney, Agent, or Firm—David L. Davis

[57] ABSTRACT

An arrangement and method for processing a cyclically varying signal to determine the time between equivalent points of successive signal cycles. A comparator receives the signal at one of its differential input terminals, the other input terminal receiving a reference voltage generated by a computer. The output of the comparator is coupled to a timer toggling input. The computer generates the reference voltage at either a trigger level or a level below the range of the signal. At first, the reference voltage is provided at the trigger level and after the comparator changes state, thereby starting the timer, the computer changes the reference voltage to the low level below the signal range. The computer changes the reference voltage back to the trigger level after a predetermined number of signal cycles, so that the next time the signal reaches the trigger level the timer is stopped.

10 Claims, 6 Drawing Sheets

CYCLIC SIGNAL PROCESSING

BACKGROUND OF THE INVENTION

This invention relates to the processing of cyclically recurring signals to determine the time between successive signal cycles. The invention is useful, for example, in conjunction with a non-invasive arrangement for detecting the periodic pathwise movement of a ferromagnetic element enclosed within a non-magnetic housing of a gas meter.

Gas meters for domestic and industrial use are typically of the positive displacement diaphragm type. Such a meter conventionally includes a housing with a vertical central partition dividing the housing into two sets of measuring chambers. Within each chamber is a flexible bellows (or convoluted sleeve diaphragm) connected to a central crankshaft by means of connecting rods. The crankshaft actuates a valve system which admits gas in and out of the bellows. The bellows is caused to expand and contract by the passage of gas through the meter and act in the same manner as a piston to accurately displace a fixed volume of gas for each stroke, or cycle, of the bellows.

One complete cycle of the bellows produces one turn of the crankshaft. In addition to being connected to the valve system, the crankshaft is also connected, through gearing, to a mechanical counter on the front of the meter. This counter is conventionally known as an index and usually contains one circular sweep hand for testing the accuracy of the meter. The dial including this circular sweep hand is commonly called the proving dial. On typical household domestic type meters, the proving dial indicates a flow of two cubic feet of gas through the meter for each turn of its sweep hand. However, due to the connecting gearing, the crankshaft usually makes eighteen turns for each turn of the proving dial sweep hand. Thus, eighteen complete cycles of the bellows are needed for one cycle of the proving dial sweep hand.

Meter accuracy is determined by measuring the actual volume of gas flowing through the meter for each turn of the proving hand. Meters are usually tested at 20% and 100% of their flow rate capacity. Since a domestic type meter normally has a capacity of 250 cubic feet per hour, it requires two minutes and twenty-four seconds for the proving hand to indicate two cubic feet at the 20% capacity rate. This is extremely time consuming when testing meters on a production basis. It would therefore be desirable to have an arrangement for reducing the amount of time required to test meters for accuracy, in particular by being able to sense internal meter motion so as to detect a single turn of the crankshaft. At the 20% capacity rate, this would take only eight seconds and at the 100% capacity rate, only one and six-tenths seconds. Therefore, by basing the meter accuracy test on only several turns of the crankshaft (i.e., several cycles of the bellows) considerable time could be saved in proving the meter accuracy. It would also be desirable to have an arrangement which is non-invasive in nature so that the motion sensing arrangement does not have any effect on meter operation.

U.S. Pat. No. 4,848,148, the contents of which are hereby incorporated by reference, discloses such an arrangement wherein cycles of operation of a positive displacement diaphragm gas meter are detected by setting up a magnetic field which is directed through the non-magnetic housing of the meter toward an internal cyclically moving ferromagnetic element (e.g., the bellows pan) of the meter. The strength of the magnetic field varies as the ferromagnetic element moves toward and away from the source of the magnetic field, and the magnetic field strength is detected by a Hall effect sensor. An output signal from the sensor, which is representative of the magnetic field strength, is processed to define cycles of operation of the meter. However, the steady state output voltage of the Hall effect sensor is dependent upon the ferromagnetic properties of the ferromagnetic element of the diaphragm meter to which it is in close proximity. Further, the output voltage of the Hall effect sensor changes as the ferromagnetic element moves toward and away from the sensor. This overall change in voltage is dependent upon the ferromagnetic properties of the ferromagnetic element and can vary from as little as 30 mv peak-to-peak to as high as several volts peak-to-peak between meters of different size and type. It is therefore an object of this invention to provide an improved arrangement for processing the cyclic output signal from a Hall effect sensor in an arrangement of the type described in such a way as to be insensitive to noise and signal level so that the same motion sensing arrangement can be utilized with different size and type meters.

Present day state of the art meter testers (or provers) are typically computer controlled. If the computer was required to monitor the testing on a continuous basis, this would be very inefficient because the computer would not be available for other tasks. It is therefore another object of this invention to provide a signal processing arrangement of the type described wherein a computer is used in a supervisory manner to control precision timing hardware which processes the sensor output signal, the computer setting up the conditions under which the timing hardware determines when to start and stop the timing operation.

Meter testing apparatus should preferably be universal—that is, it should accommodate different size meters. However, different size (capacity) meters have different characteristics which affect the output signal of the Hall effect sensor. To a lesser extent, the output signal differs between meters of the same size. Further, the output signal changes as a function of ambient conditions. It is therefore a further object of this invention to provide a signal processing arrangement of the type described which is adaptive so that it operates effectively independent of the meter being tested or the ambient conditions.

Not all diaphragm meters are of the type wherein the position of an internal ferromagnetic element can be monitored. For example, some diaphragm meters have a ferromagnetic housing. However, it has been found that differential pressure measurements across a diaphragm meter have cyclic characteristics caused by valve openings and closings. It is therefore still another object of this invention to provide a signal processing arrangement of the type described which can be utilized generally to determine the time between equivalent points of successive cycles of a cyclically varying signal, independent of the origin of the signal.

SUMMARY OF THE INVENTION

The foregoing and additional objects of this invention are attained by providing an arrangement for processing a cyclically varying signal to determine the time between equivalent points of successive signal cycles. The arrangement comprises a comparator having a pair of differential input terminals and an output terminal, a computer and a timer. The signal is coupled to one of the comparator input terminals and to the computer. The computer is coupled to the other of the comparator input terminals to provide a reference voltage and the comparator output terminal is coupled to the timer. The comparator is effective to provide a comparator output signal at a first level on its output terminal when the signal level is less than the reference voltage and to provide a comparator output signal at a second level when the signal level is greater than the reference voltage. The timer is effective to time an interval commencing when the comparator output signal first changes to its second level and terminating when the comparator output signal next changes to its second level. The computer is effective to sample the signal, to provide the reference voltage at a first predetermined level which is between the minimum and maximum levels of the signal at a time when the signal is below the first predetermined level, to change the reference voltage to a second predetermined level which is less than the minimum level of the signal upon the comparator output signal changing to its second level, and to change the reference voltage back to the first predetermined level when the signal level decreases below the first predetermined level. Accordingly, an accurate time measurement is made between equivalent points on successive cycles of the signal. This time measurement is performed by the hardware timer, with the computer operating in a supervisory manner only to control the level of the comparator input reference voltage.

In accordance with an aspect of this invention, there is provided a method for processing a cyclically varying signal to determine the time between equivalent points of successive signal cycles. The method includes the steps of analyzing the signal to determine its maximum and minimum levels, providing a reference voltage at a first predetermined level which is between the minimum and maximum levels of the signal at a time when the signal is below the first predetermined level, comparing the signal with the reference voltage, starting a timer when the signal level is equal to the reference voltage, changing the reference voltage when the timer is started to a second predetermined level which is less than the minimum level of the signal, changing the reference voltage back to the first predetermined level when the signal level decreases below a third predetermined level which is less than the first predetermined level, and stopping the timer when the signal level is equal to the reference voltage. This method can be used for controlling the operation of a computer to supervise precision timing hardware.

In accordance with another aspect of this invention, when the successive signal cycles are separated by a predetermined number of intermediate signal cycles, the method comprises the further steps of incrementing a counter when the signal level decreases below the third predetermined level, and delaying changing the reference voltage back to the first predetermined level until the count in the counter is equal to one more than the predetermined number of intermediate signal cycles.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
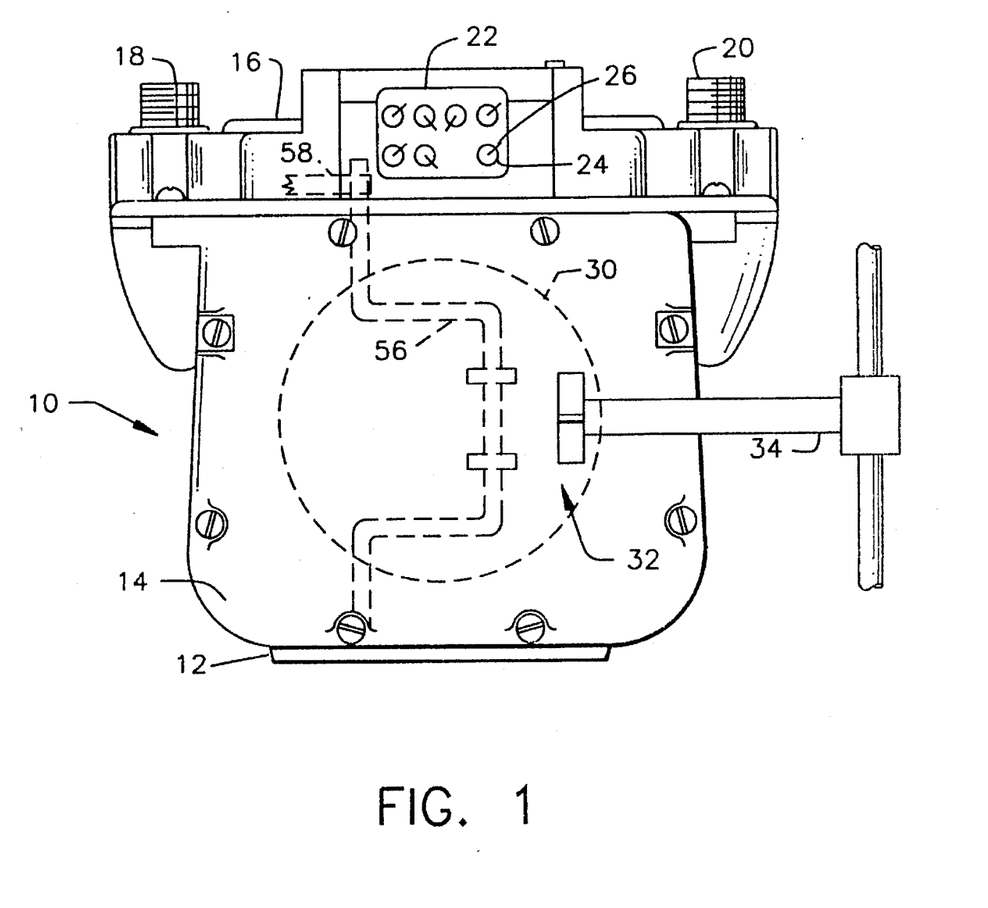
FIG. 1 is a front view of a conventional diaphragm meter showing a portion of an arrangement constructed in accordance with the principles of this invention in place for determining the time between successive cycles of operation of the meter.

Referring now to the drawings, FIG. 1 illustrates a conventional positive displacement diaphragm gas meter, designated generally by the reference numeral 10, with which an arrangement constructed in accordance with the principles of this invention may be utilized. The meter 10 includes a main housing which comprises a body member 12, a front cover 14, a back cover (not shown) and a top cover 16. As is conventional, the top cover 16 has integral inlet and outlet fittings 18 and 20, respectively, for connection into a gas line. At the front of the top cover is an index 22, driven from a crankshaft through internal gearing. The index 22 has a plurality of dials including a proving dial 24 having a circular sweep hand 26. The foregoing details are conventional and well known in the art.

Typically, the elements making up the housing of the meter 10 (i.e., the body member and the front, back and top covers) are manufactured from a non-magnetic material such as die cast aluminum. Alternatively, these members may be made of a molded plastic composition if the technology so permits.

Within the housing of the meter 10, is a bellows assembly which includes a convoluted diaphragm sleeve element 28 fixedly mounted at one end (not shown) and sealed at the other end by a bellows pan 30. Conventionally, the bellows pan 30 is made of stamped steel, which is a ferromagnetic material. During an operating cycle of the meter 10, the pan 30 travels over a known path. In particular, motion of the pan 30 is translatory toward and away from the front cover 14 over a distance "S" (FIG. 2) which is the stroke of the diaphragm 28. One complete cycle of this motion (i.e., from a position of the pan 30 closest to the front cover 14 to a position of the pan 30 furthest away from the front cover 14 and back to the position closest to the front cover 14) corresponds to one complete cycle of operation of the meter 10, which indicates that a known volume of gas has passed through the meter 10. It typically requires eighteen of these cycles for the proving hand 26 to make one complete rotation.

Figure 2:
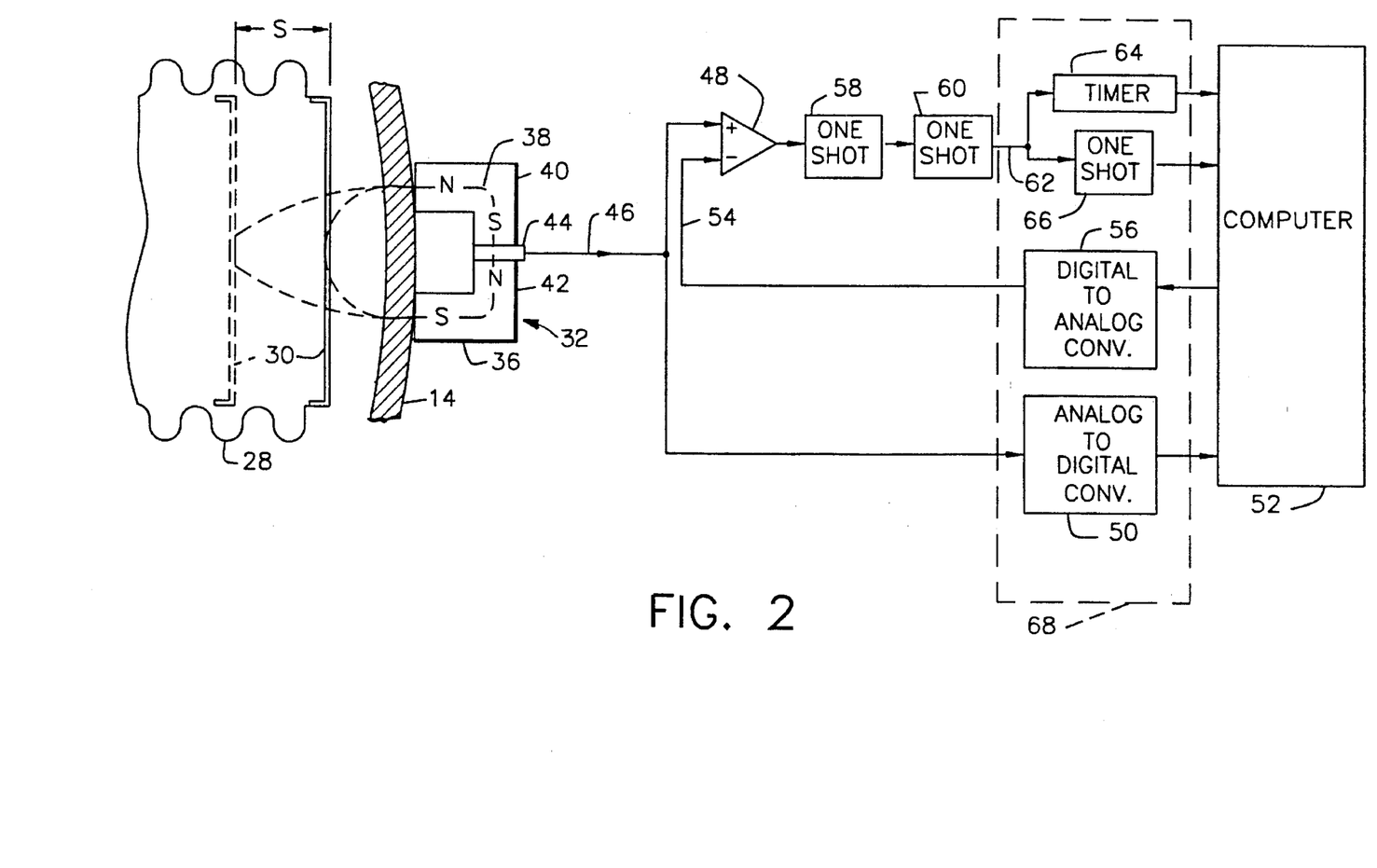
FIG. 2 is a schematic representation of the arrangement shown in FIG. 1 and taken as a side view through the meter illustrating changes in the magnetic field during the operation of the meter and showing illustrative circuitry for the processing of electrical signals to determine the time between successive cycles of operation of the meter.

Motion of the pan 30 may be sensed to define an operating cycle of the meter 10. To sense such motion, a proximity sensor, designated generally by the reference numeral 32, is held in position by a support 34 close to the front cover 14, as shown in FIG. 2, and within the projected area of the pan 30, as shown in FIG. 1. Illustratively, the proximity sensor 32 includes a magnetic structure 36 having north and south magnetic poles so arranged that the magnetic lines of flux are directed through the non-magnetic front cover 14 of the meter and are attracted by the pan 30. As the bellows assembly is cycled by the gas flow, the pan 30 moves between the positions shown in solid and broken lines. This results in a change in length of the magnetic flux lines 38, as shown in FIG. 2. The increased length of the magnetic flux lines 38 when the pan 30 is in the broken line position reduces the total amount of magnetic flux which can flow through the magnet structure 36. Illustratively, the magnet structure 36 comprises magnets 40 and 42 which are spaced apart and arranged with their poles in series aiding relationship to provide a magnetic field with the lines of flux 38 passing through both the magnets 40 and 42. In the space between the magnets 40 and 42 there is supported a magnetic flux detector 44. The flux detector 44 is preferably a Hall effect sensor, illustratively a Model 3501 Linear Hall Effect Sensor manufactured by Sprague Electric. The detector 44 provides an output signal on the lead 46 which is representative of the magnitude of magnetic flux passing through the detector 44. As the pan 30 moves toward and away from the proximity sensor 32, the magnitude of magnetic flux increases and decreases, respectively. Accordingly, the output signal on the lead 46 cyclically varies in this manner, approaching a sinusoidal form.

Figure 3A:
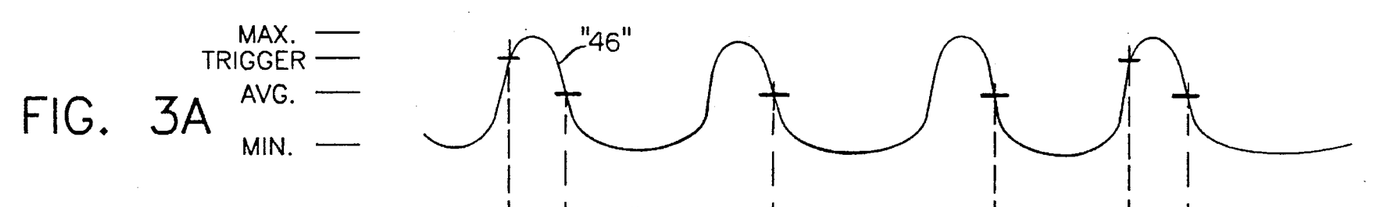
FIGS. 3A, 3B and 3C show waveforms useful in understanding the principles of this invention.

The signal on the lead 46 has the general form shown in FIG. 3A, as indicated by the reference numeral "46". This signal is applied to the non-inverting input of the comparator 48, as well as to the input of the analog to digital converter 50. The computer 52 provides a reference voltage to the inverting input of the comparator 48 on the lead 54 through the digital to analog converter 56. This reference voltage takes the form shown in FIG. 3B, as indicated by the reference numeral "54". The output of the comparator 48 is applied to the series connected one-shot circuits 58, 60 and the resulting signal on the lead 62, whose waveform is shown in FIG. 3C as indicated by the reference numeral "62", is applied to the timer 64 and the one-shot circuit 66. The reason for the two one-shot circuits 58, 60 is to prevent false triggering of the timer 64 and the one-shot circuit 66 if the output of the comparator 48 oscillates during transitions.

Illustratively, the computer 52 is an IBM compatible personal computer. The timer 64, the one-shot circuit 66, the digital to analog converter 56 and the analog to digital converter 54 are all part of an input/output board 68 which is illustratively an AT-MIO-16 standard resolution multifunction I/O board for the IBM PC AT, manufactured by National Instruments. This board includes a five channel counter/timer, one of the counter/timer channels being configured to operate as the timer 64 and another of the counter/timer channels being configured to operate as the one-shot circuit 66.

According to the present invention, cycle timing is performed by the timer 64, which is configured to commence timing upon sensing a first predetermined transition of the signal at its input and to terminate timing upon sensing the next predetermined transition of the signal at its input. For this cycle timing, the computer 52 is arranged to operate in a supervisory manner to control the reference signal input to the comparator 48, as will be described in full detail hereinafter.

Figure 3B:
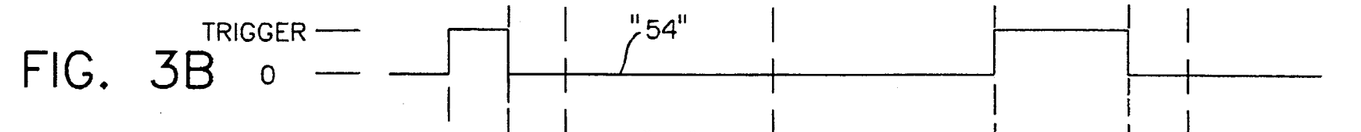
Figure 3C:
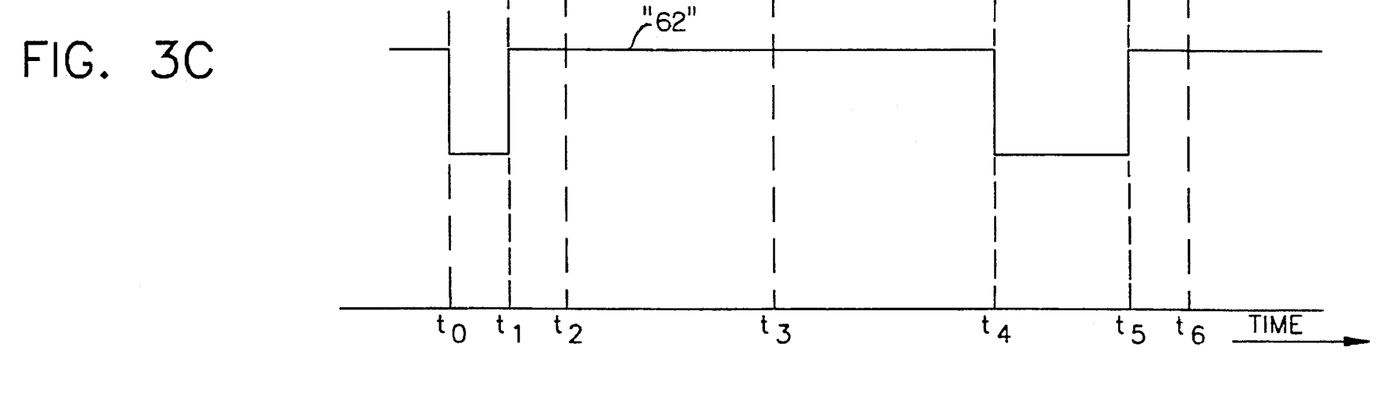
Figure 4A:
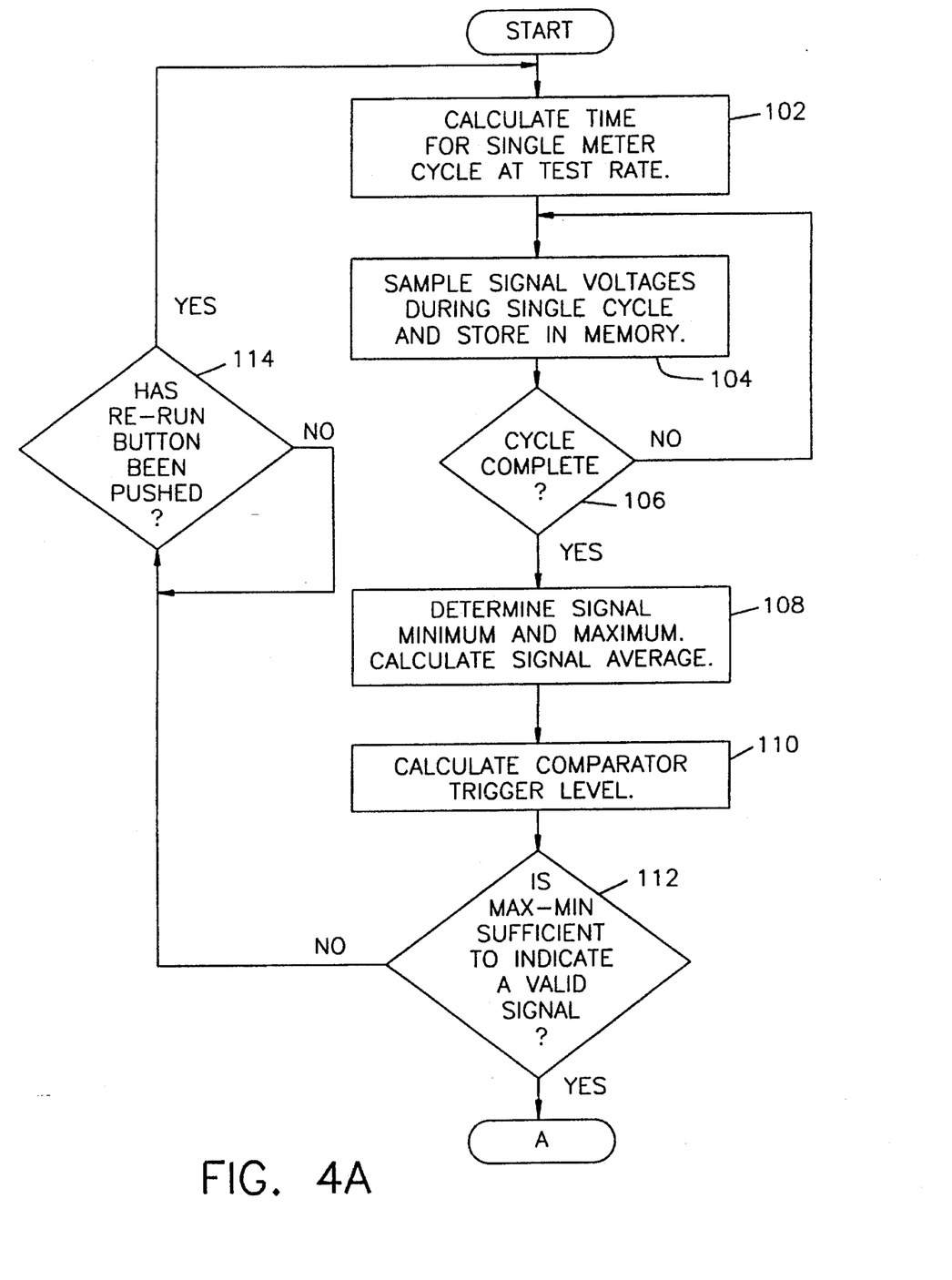
FIGS. 4A, 4B and 4C together constitute a flow chart illustrating the operation of a computer in accordance with the principles of this invention.
Figure 4B:
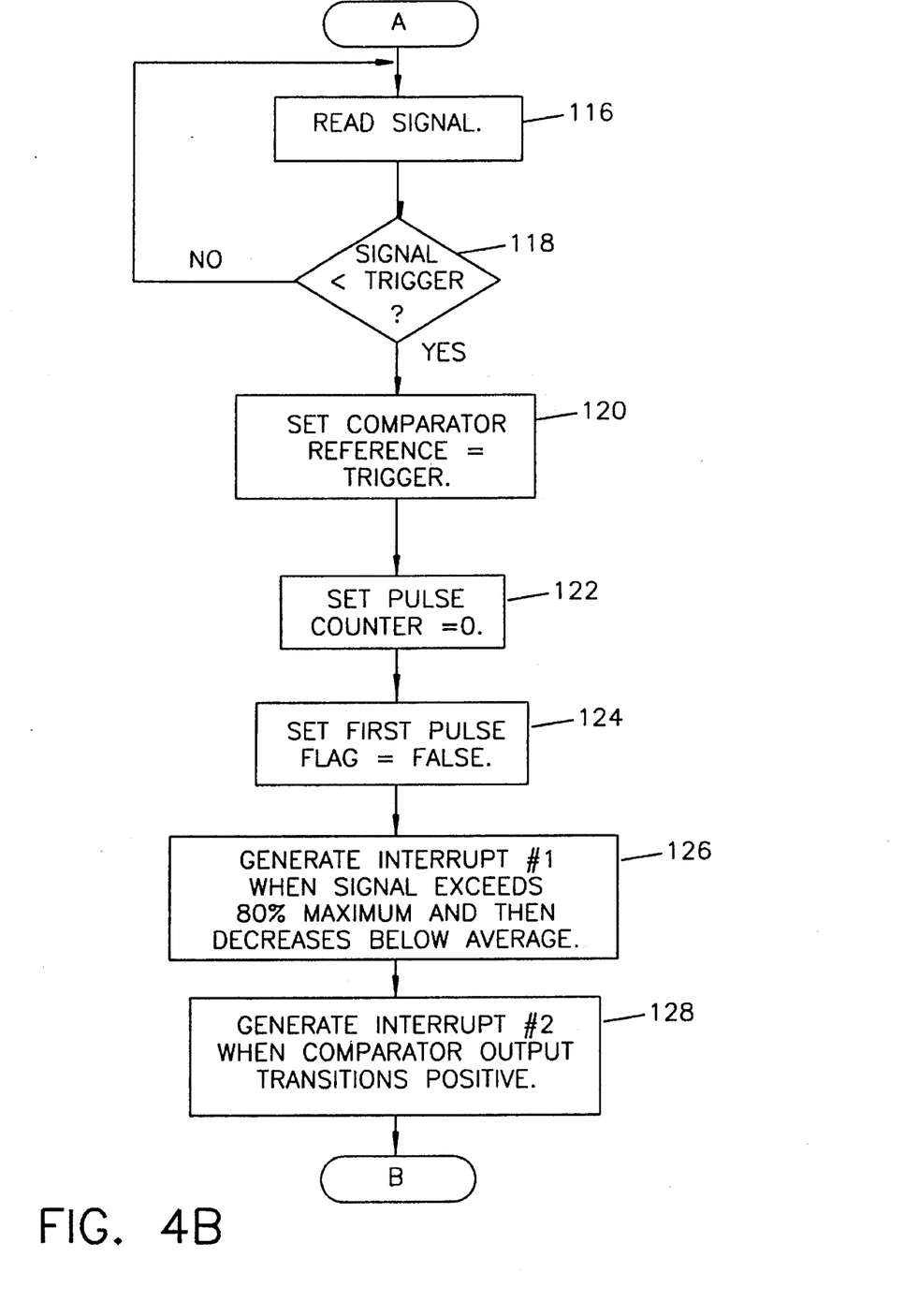
Figure 4C:
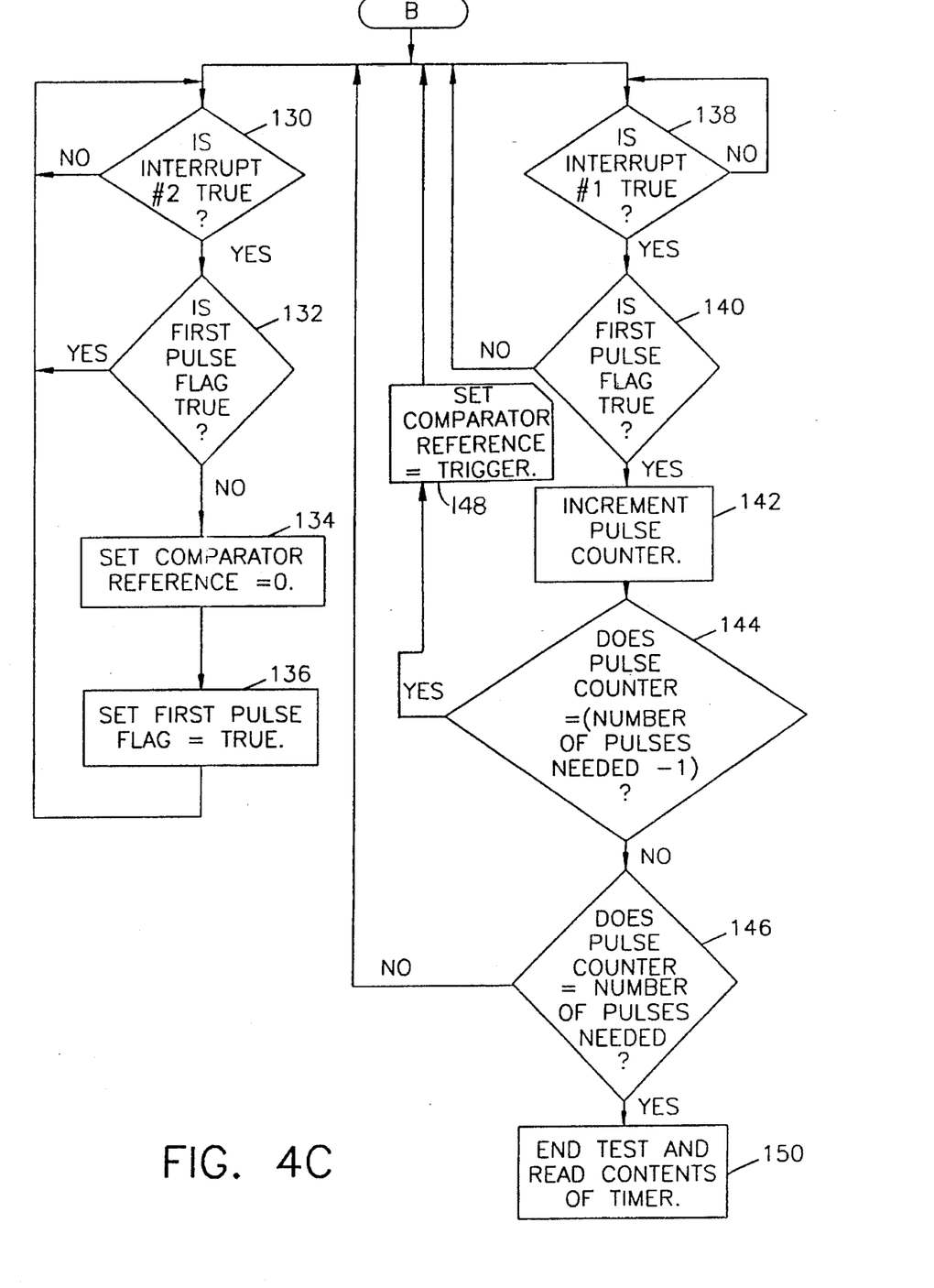

Referring now to the flow chart shown in FIGS. 4A, 4B and 4C, along with the waveforms shown in FIGS. 3A, 3B and 3C, the computer 52 first goes through an initialization routine, as shown in FIG. 4A. As indicated in the block 102, the computer first calculates the time for a single meter cycle at the test rate, the test rate being established by the testing authority as the flow rate at which the test is to be performed. Next, as shown in the block 104, the signal voltages as provided by the analog to digital converter 50 are sampled, illustratively at a rate of 125 samples per second, during that single cycle and are stored in the memory of the computer 52. This continues until the single cycle is completed, as indicated by the decision block 106. The computer 52 then determines, from the stored values, the minimum and maximum levels of the signal and calculates the signal average level, as shown in the block 108. As shown by the block 110, the computer 52 then calculates the trigger level for the comparator 48. Illustratively, this trigger level is between the average signal level and the maximum signal level. As shown by the decision block 112, the computer 52 then determines whether the difference between the maximum and minimum levels of the signal is sufficient to run a valid test. Illustratively, this difference is twenty millivolts. If not, the computer displays to the operator an indication that the signal level is insufficient and waits for the operator to request that the test be rerun, as indicated by the decision block 114.

Referring now to FIG. 4B, after the computer 52 has completed its initialization and has determined that a valid signal is present, it reads the signal appearing at the output of the analog to digital converter 50, as shown in the block 116. The reading is done on a sampling basis, illustratively at a rate of 125 samples per second. Each time the signal is sampled, the computer 52 checks to see whether the level of the sampled signal is less than the previously calculated trigger level, as shown by the decision block 118. When the signal level is below the trigger level, the computer 52 sets the comparator reference voltage on the lead 54 to the trigger level, via the digital to analog converter 56, as shown by the block 120. This occurs at the time $t_0$ (FIG. 3B). At this time, the output of the comparator 48 goes low, causing the output of the one-shot circuit 60 on the lead 62 to go low (FIG. 3C). Also at this time, the computer sets an internal pulse counter to zero, as indicated by the block 122, and sets a first pulse flag to false, as indicated by the block 124.

The computer 52 is programmed to respond to two separate interrupts. As indicated by the block 126, interrupt number one is generated when the sampled signal exceeds 80% of the previously determined maximum level and then decreases below the previously determined average level. As indicated by the block 128, interrupt number two is generated when the output of the comparator 48 makes a positive transition, as indicated by the output of the one-shot circuit 60 on the lead 62 going positive.

Referring now to FIG. 4C, along with FIGS. 3A, 3B and 3C, the computer 52 responds to the two interrupts to perform its supervisory tasks relating to cycle timing. The first event to occur is at time $t_1$, at which time interrupt number two is generated, as shown by the decision block 130. When responding to interrupt number two, the computer determines whether the first pulse flag is true, as indicated by the decision block 132. As previously discussed, at time $t_0$ the first pulse flag had been set false, so in response to interrupt number two at time $t_1$, the computer sets the reference voltage to the comparator 48 on the lead 54 to zero, as indicated by the block 134, and at the same time sets the first pulse flag true, as indicated by the block 136. At the time that interrupt number two is generated, the timer 64 is toggled. That is, the first time interrupt number two is generated (i.e., at the time $t_1$) the timer 64 is caused to begin timing. The next time interrupt number two is generated (i.e., at the time $t_5$ as will be discussed hereinafter) the timer 64 is caused to stop timing.

The next event of significance occurs at time $t_2$, when interrupt number one is generated, as indicated by the decision block 138. Since the first pulse flag had been set to true at time $t_1$, the pulse counter is incremented as indicated by the decision block 140 and the block 142. The present invention is adapted to have the operator set into the computer 52 the total number of meter cycles which are to be timed. In the example shown in FIGS. 3A, 3B and 3C, the timing for three full cycles of operation of the meter are indicated. (The actual number of pulses used by the computer is one more than the number of full cycles, since in the example of three full cycles it is the fourth pulse which ends the timing.) Thus, after the pulse counter is incremented, the computer checks to see whether the contents of the pulse counter is one less than the total number of pulses needed, as indicated by the decision block 144. At the time $t_2$, the answer is no so the computer checks to see whether the contents of the pulse counter is equal to the number of pulses needed, as indicated by the decision block 146. At the time $t_2$, the answer is no, since the number of pulses needed is four, and the computer 52 then awaits the next generation of interrupt number one. This occurs at the time $t_3$, wherein the pulse counter is incremented to two.

The next time that interrupt number one is generated is at the time $t_4$. The pulse counter is then incremented to three. However, at this time in the decision block 144 it is determined that the contents of the pulse counter is one less than the number of pulses needed. Therefore, at time $t_4$, the computer 52 sets the comparator 48 reference voltage on the lead 54 equal to the trigger level, as indicated by the block 148 and as shown in FIG. 3B. This causes the output of the one-shot circuit 60 to go low until the time $t_5$ when the sensor output signal again equals the trigger level, which causes the generation of interrupt number two, thereby stopping the timer 64. This action is entirely independent of the operation of the computer 52. However, at the time $t_6$, the interrupt number one is generated and the pulse counter is incremented to four. When the computer reaches the decision block 146 it determines that the contents of the pulse counter is equal to the number of pulses needed. The computer then ends the test and reads the contents of the timer 64, as indicated by the block 150. The computer then utilizes that timing information to determine the meter accuracy.

Thus, as described, the actual timing is performed by precision timing hardware, with the computer 52 functioning in a supervisory manner to control the level at the reference input of the comparator 48, as indicated by the blocks 120, 134 and 148. Thus, during most of the timing operation, the computer is free to perform other tasks.

Accordingly, there has been disclosed an improved method and arrangement for processing cyclically recurring signals to determine the time between successive signal cycles. While a preferred embodiment for the inventive arrangement and method has been disclosed, it is understood that the above-described embodiment is merely illustrative of the application of the principles of this invention. Numerous other embodiments may be devised by those skilled in the art without departing from the spirit and scope of this invention, as defined by the appended claims.

What is claimed is:

1. An arrangement for processing a cyclically varying signal to determine the time between equivalent points of successive signal cycles, comprising:

a comparator having a pair of differential input terminals and an output terminal;

computer means;

a timer;

first coupling means for coupling the signal to one of said comparator input terminals;

second coupling means for coupling the signal to said computer means;

third coupling means for coupling said computer means to the other of said comparator input terminals to provide a reference voltage thereat;

fourth coupling means for coupling said comparator output terminal to said timer;

wherein the comparator is effective to provide a comparator output signal at a first level on its output terminal when the signal level is less than the reference voltage and to provide a comparator output signal at a second level when the signal level is greater than the reference voltage;

wherein the timer is effective to time an interval commencing when the comparator output signal first changes to its second level and terminating when the comparator output signal next changes to its second level; and wherein the computer means is effective to sample the signal, to provide the reference voltage at a first predetermined level which is between the minimum and maximum levels of the signal at a time when the signal is below the first predetermined level, to change the reference voltage to a second predetermined level which is less than the minimum level of the signal upon the comparator output signal changing to its second level, and to change the reference voltage back to the first predetermined level when the signal level decreases below the first predetermined level.

2. The arrangement according to claim 1 wherein said second coupling means includes analog to digital converter means and said third coupling means includes digital to analog converter means.

3. The arrangement according to claim 2 wherein said fourth coupling means includes a one-shot multivibrator circuit.

4. A method for processing a cyclically varying signal to determine the time between equivalent points of successive signal cycles, comprising the steps of:

analyzing the signal to determine its maximum and minimum levels;

providing a reference voltage at a first predetermined level which is between the minimum and maximum levels of the signal at a time when the signal is below the first predetermined level;

comparing the signal with the reference voltage;

starting a timer when the signal level is equal to the reference voltage;

changing the reference voltage when the timer is started to a second predetermined level, which is less than the minimum level of the signal;

changing the reference voltage back to the first predetermined level when the signal level decreases below a third predetermined level which is less than the first predetermined level; and stopping the timer when the signal level is equal to the reference voltage.

5. The method according to claim 4 wherein the successive signal cycles are separated by a predetermined number of intermediate signal cycles, the method comprising the further steps of:

incrementing a counter when the signal level decreases below the third predetermined level; and delaying changing the reference voltage back to the first predetermined level until the count in the counter is equal to one more than the predetermined number of intermediate signal cycles.

6. In a system for processing a cyclically varying signal to determine the time between equivalent points of successive signal cycles, wherein the system includes a comparator, a timer and a computer, with the computer being coupled to receive the signal and the output of the comparator, the comparator being coupled to receive the signal and to receive a reference voltage provided by the computer, and the timer being coupled to receive the output of the comparator and being effective to time an interval commencing when the comparator first determines that the level of the signal has increased to be equal to the reference voltage and terminating when the comparator next determines that the level of the signal has increased to be equal to the reference voltage, a method of operating the computer to provide the reference voltage, comprising the steps of:

sampling the signal at a regular rate during a preliminary cycle;

storing the sampled signal values;

determining from the stored sampled signal values the minimum level of the signal during the preliminary cycle;

determining from the stored sampled signal values the maximum level of the signal during the preliminary cycle;

calculating a first reference voltage level which is between the minimum and maximum signal levels;

calculating a second reference voltage level which is less than the minimum signal level;

providing the reference voltage to the comparator at the first reference voltage level at a time when the signal is below the first predetermined level;

providing the reference voltage to the comparator at the second reference voltage level when the comparator determines that the signal is equal to the reference voltage; and     providing the reference voltage to the comparator at the first reference voltage level when the signal decreases below the first reference voltage level.

7. The method according to claim 6 wherein the successive signal cycles are separated by a predetermined number of intermediate signal cycles, comprising the further steps of:

counting the number of times the signal level decreases below the first reference voltage level; and     delaying the second step of providing the reference voltage to the comparator at the first reference voltage level until the number of times the signal level decrease below the first reference voltage level is equal to one more than the predetermined number of intermediate signal cycles.

8. An arrangement for non-invasively calibration testing a positive displacement diaphragm gas meter having a non-magnetic housing and an internal cyclically moving ferromagnetic element, comprising;

a magnet;

means for supporting said magnet outside said housing and in proximity to said element so that movement of said element causes the strength of the magnetic field of said magnet to cyclically vary;

magnetic flux detector means for providing a signal representative of the magnitude of magnetic flux passing through said magnetic flux detector means;

means for mounting said magnetic flux detector means outside said housing and within the magnetic field of said magnet;

a comparator having a pair of differential input terminals and an output terminal;

computer means;

a timer;

first coupling means for coupling the signal to one of said comparator input terminals;

second coupling means for coupling the signal to said computer means;

third coupling means for coupling said computer means to the other of said comparator input terminals to provide a reference voltage thereat;

fourth coupling means for coupling said comparator output terminal to said timer;

wherein the comparator is effective to provide a comparator output signal at a first level on its output terminal when the signal level is less than the reference voltage and to provide a comparator output signal at a second level when the signal level is greater than the reference voltage;

wherein the timer is effective to time an interval commencing when the comparator output signal first changes to its second level and terminating when the comparator output signal next changes to its second level; and     wherein the computer means is effective to sample the signal, to provide the reference voltage at a first predetermined level which is between the minimum and maximum levels of the signal at a time when the signal is below the first predetermined level, to change the reference voltage to a second predetermined level which is less than the minimum level of the signal upon the comparator output signal changing to its second level, and to change the reference voltage back to the first predetermined level when the signal level decreases below the first predetermined level.

9. The arrangement according to claim 8 wherein said second coupling means includes analog to digital converter means and said third coupling means includes digital to analog converter means.

10. The arrangement according to claim 9 wherein said fourth coupling means includes a one-shot multivibrator circuit.

* * * * *